US010723023B2

(12) United States Patent
Inoue

(10) Patent No.: US 10,723,023 B2
(45) Date of Patent: Jul. 28, 2020

(54) CONTROL DEVICE AND CONTROL METHOD FOR CONTROLLING WORKPIECE MOVING DEVICE AND ROBOT TO OPERATE IN COOPERATION WITH EACH OTHER

(71) Applicant: Fanuc Corporation, Minamitsuru-gun, Yamanashi (JP)

(72) Inventor: Toshihiko Inoue, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 95 days.

(21) Appl. No.: 16/165,290

(22) Filed: Oct. 19, 2018

(65) Prior Publication Data
US 2019/0118379 A1    Apr. 25, 2019

(30) Foreign Application Priority Data
Oct. 24, 2017    (JP) .................................. 2017-205265

(51) Int. Cl.
*B25J 9/00*    (2006.01)
*B25J 9/16*    (2006.01)
(Continued)

(52) U.S. Cl.
CPC .............. *B25J 9/1664* (2013.01); *B23K 9/16* (2013.01); *B23K 26/00* (2013.01); *B23K 31/02* (2013.01);
(Continued)

(58) Field of Classification Search
CPC ........ B23K 26/00; B23K 31/02; B23K 37/02; B23K 37/04; B23K 37/0443; B23K 37/047; B23K 9/16; B25J 11/005; B25J 9/0084; B25J 9/0096; B25J 9/1664; B25J 9/1669; B25J 9/1682; G05B 19/41815; G05B 2219/33088; G05B 2219/33097; G05B 2219/34314; G05B 2219/39101; G05B 2219/39105; G05B 2219/39144;
(Continued)

(56) References Cited

U.S. PATENT DOCUMENTS 4,541,062 A    9/1985    Kada et al.
7,729,804 B2    6/2010    Matsumoto et al.
(Continued)

FOREIGN PATENT DOCUMENTS

| JP | S54110558 A | 8/1979 |
|---|---|---|
| JP | 59206708 A | 11/1984 |
| JP | S62039152 A | 2/1987 |
| JP | S62245306 A | 10/1987 |
| JP | H02205490 A | 8/1990 |
| JP | H04002482 A | 1/1992 |

(Continued)

*Primary Examiner* — Dale Moyer
(74) *Attorney, Agent, or Firm* — RatnerPrestia

(57) ABSTRACT

This control device is able to prevent the position displacement of a workpiece supported by a workpiece moving device. The control device includes a workpiece moving device controller configured to control the workpiece moving device wherein a time constant corresponding to a time period from a commencement to an termination of acceleration and deceleration of the workpiece moving device is longer for causing the robot and the workpiece moving device to perform an operation other than the workpiece processing operation, compared with the time constant for performing a workpiece processing operation in which the robot and the workpiece moving device perform work on the workpiece in cooperation with each other.

6 Claims, 7 Drawing Sheets

(51) Int. Cl.
*B23K 37/04* (2006.01)
*B23K 31/02* (2006.01)
*B23K 37/02* (2006.01)
*B23K 9/16* (2006.01)
*B23K 26/00* (2014.01)
*B25J 11/00* (2006.01)

(52) U.S. Cl.
CPC .............. *B23K 37/02* (2013.01); *B23K 37/04* (2013.01); *B23K 37/0443* (2013.01); *B25J 9/0096* (2013.01); *B25J 11/005* (2013.01)

(58) Field of Classification Search
CPC ........ Y02P 90/08; Y02P 90/087; Y02P 90/18; Y02P 90/20
See application file for complete search history.

(56) References Cited

U.S. PATENT DOCUMENTS

| | | | | |
|---|---|---|---|---|
| 2006/0217841 | A1* | 9/2006 | Matsumoto | ............ B25J 9/1669 700/248 |
| 2009/0301253 | A1* | 12/2009 | Nishida | ................. B25J 9/1623 74/490.01 |

FOREIGN PATENT DOCUMENTS

| | | | |
|---|---|---|---|
| JP | H06286875 | A | 10/1994 |
| JP | 08320714 | A | 12/1996 |
| JP | 2006043839 | A | 2/2006 |
| JP | 2006-136918 | A | 6/2006 |
| JP | 2006263850 | A | 10/2006 |
| JP | 2009075898 | A | 4/2009 |
| JP | 2009297792 | A | 12/2009 |

* cited by examiner (a)

(b)

CONTROL DEVICE AND CONTROL METHOD FOR CONTROLLING WORKPIECE MOVING DEVICE AND ROBOT TO OPERATE IN COOPERATION WITH EACH OTHER

CROSS-REFERENCE TO RELATED APPLICATION

This application is a new U.S. Patent Application that claims benefit of Japanese Patent Application No. 2017-205265, filed Oct. 24, 2017 for all purposes.

BACKGROUND OF THE INVENTION

1. Field of the Invention

The invention relates to a control device and a control method for controlling a workpiece moving device and a robot to operate in cooperation with each other.

2. Description of the Prior Art

There is a known technology for causing a workpiece moving device moving a workpiece and a robot performing work such as welding on a workpiece to operate in cooperation with each other (e.g., JP 2006-136918 A).

In the prior art, there has been a case where an acceleration of a workpiece moving device during a non-processing operation in which a robot does not perform work on a workpiece becomes excessive and this has caused the position displacement of the workpiece supported by the workpiece moving device.

SUMMARY OF THE INVENTION

In an aspect of the present disclosure, a control device, which is configured to control a workpiece moving device moving a workpiece and a robot carrying out a work on the workpiece such that the workpiece moving device and the robot cooperate with each other, includes a workpiece moving device controller configured to control the workpiece moving device such that a time constant for when the robot and the workpiece moving device performs an operation other than a workpiece processing operation, in which the robot and the workpiece moving device carries out a work on the workpiece in cooperation with each other, is longer than that for when the robot and the workpiece moving device performs the workpiece processing operation, wherein the time constant corresponds to a time period from commencement to termination of acceleration or deceleration of the workpiece moving device.

In another aspect of the present disclosure, a method of controlling a workpiece moving device moving a workpiece and a robot carrying out a work on the workpiece such that the workpiece moving device and the robot cooperate with each other, includes controlling the workpiece moving device such that a time constant for when the robot and the workpiece moving device performs an operation other than a workpiece processing operation, in which the robot and the workpiece moving device carries out a work on the workpiece in cooperation with each other, is longer than that for when the robot and the workpiece moving device performs the workpiece processing operation, wherein the time constant corresponds to a time period from commencement to termination of acceleration or deceleration of the workpiece moving device.

According to the present disclosure, it is possible to prevent an acceleration of an operation speed from being excessively large when the workpiece moving device is accelerated or decelerated during a non-processing operation. This makes it possible to prevent the position displacement of the workpiece placed on the workpiece moving device.

DETAILED DESCRIPTION

Figure 1:
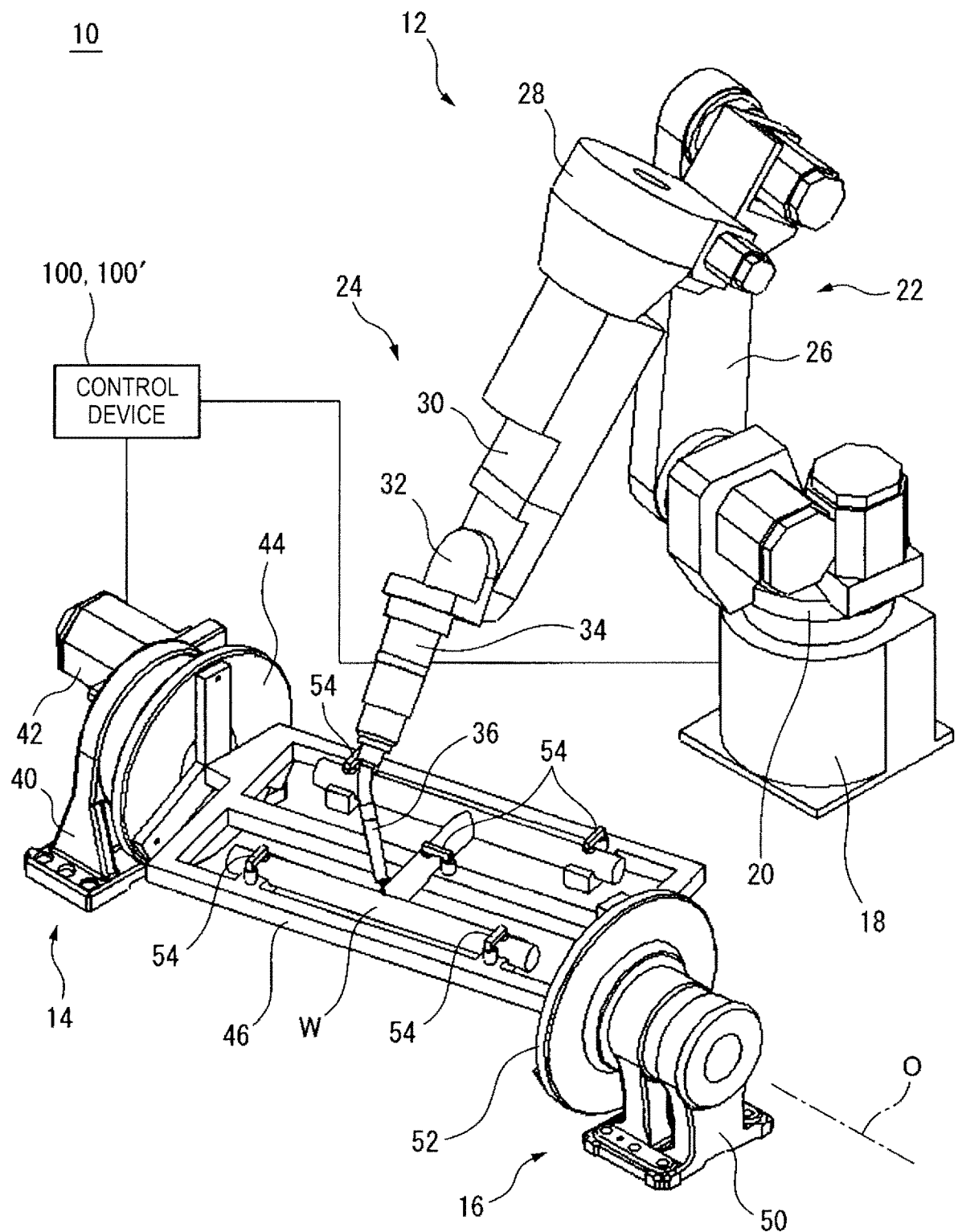
FIG. 1 is a view of a system according to an embodiment.

Hereinafter, embodiments of the present disclosure will be described in detail with reference to the drawings. Note that, in the various embodiments described below, similar elements are assigned the same reference numeral, and redundant descriptions thereof will be omitted. First, a system 10 according to an embodiment will be described with reference to FIGS. 1 and 2.

The system 10 according to this embodiment is for arc-welding on a workpiece W, and includes a robot 12, a workpiece moving device 14, a driven device 16, and a control device 100. The robot 12 is a vertical articulated robot, and includes a base 18, a revolving drum 20, a robot arm 22, and a wrist 24.

The revolving drum 20 is provided at the base 18 so as to be rotatable about a vertical axis. The robot arm 22 includes a lower arm 26 rotatably connected to the revolving drum 20 and an upper arm 28 rotatably connected to a distal end of the lower arm 26.

The wrist 24 includes a first wrist element 30 rotatably connected to the upper arm 28, a second wrist element 32 rotatably connected to a distal end of the first wrist element 30, and a third wrist element 34 rotatably connected to a distal end of the second wrist element 32.

An end effector 36 is attached to a distal end of the third wrist element 34. In this embodiment, the end effector 36 is a welding torch configured to carry out arc welding on the workpiece W.

Servomotors 38 (FIG. 2) are built in the base 18, the revolving drum 20, the robot arm 22, and the wrist 24, and these servomotors 38 drive the revolving drum 20, the robot arm 22 and the wrist 24, in accordance with a command from the control device 100. In this way, the robot 12 arranges the end effector 36 at an arbitrary position and orientation.

The workpiece moving device 14 includes a base 40, a motor housing 42, and an output flange 44. The motor housing 42 is fixed to the base 40 on a side opposite the output flange 44.

The output flange 44 is provided at the base 40 so as to be rotatable about an axis O. In this embodiment, the output flange 44 has a circular shape. A servomotor 48 (FIG. 2) is built in the motor housing 42. The servomotor 48 rotates the output flange 44 about the axis O in accordance with a command from the control device 100. In this way, the workpiece W set to the output flange 44 is rotated about the axis O.

The driven device 16 includes a base 50 and a driven flange 52 provided at the base 50 so as to be rotatable about the axis O. In this embodiment, the driven flange 52 has a circular shape, and is arranged concentrically with the output flange 44 with respect to the axis O.

A jig 46 for fixing the workpiece W is mounted on the output flange 44 and the driven flange 53. The jig 46 is provided with a plurality of clamp members 54 for clamping the workpiece W, wherein the workpiece W is clamped to the jig 46 by the clamp members 54.

In this way, the workpiece W is fixed to the output flange 44 and the driven flange 52 via the jig 46. When the jig 46 is rotated by the output flange 44, the driven flange 52, which supports the other end of the jig 46, is also driven to rotate about the axis O in accordance with the rotation of the jig 46.

Figure 2:
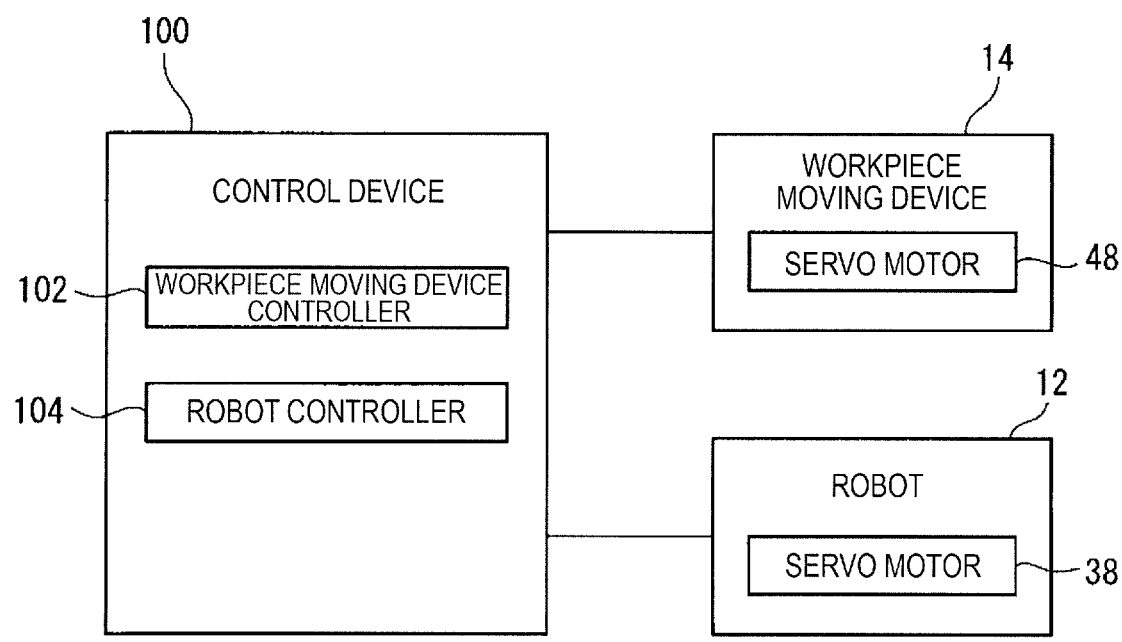
FIG. 2 is a block diagram of the system illustrated in FIG. 1.

As illustrated in FIG. 2, the control device 100 includes a workpiece moving device controller 102 and a robot controller 104. The workpiece moving device controller 102 generates a command (e.g., an acceleration command, a torque command, or a current command) to the servomotor 48 built in the workpiece moving device 14, and controls an operation (specifically, a rotation of the output flange 44) of the workpiece moving device 14.

The robot controller 104 generates a command (an acceleration command, torque command, or current command) to the servomotor 38 built in the robot 12, and controls an operation of the robot 12. In addition, the robot controller 104 transmits a command to the end effector 36 so as to carry out a work (specifically, arc welding) on the workpiece W by the end effector 36.

The control device 100 includes at least one processor and storage (both not illustrated). A single processor may functions as the workpiece moving device controller 102 and the robot controller 104, or different processors may functions as the workpiece moving device controller 102 and the robot controller 104, respectively. The function of the workpiece moving device controller 102 and the robot controller 104 will be described later.

The control device 100 performs a workpiece processing operation to carry out the work on the workpiece W by the end effector 36 while operating the robot 12 and the workpiece moving device 14 in cooperation with each other. Hereinafter, with reference to FIG. 3, an operation speed of the robot 12 and the workpiece moving device 14 when the robot 12 and the workpiece moving device 14 are caused to operate in cooperation with each other during the workpiece processing operation will be described.

Figure 3:
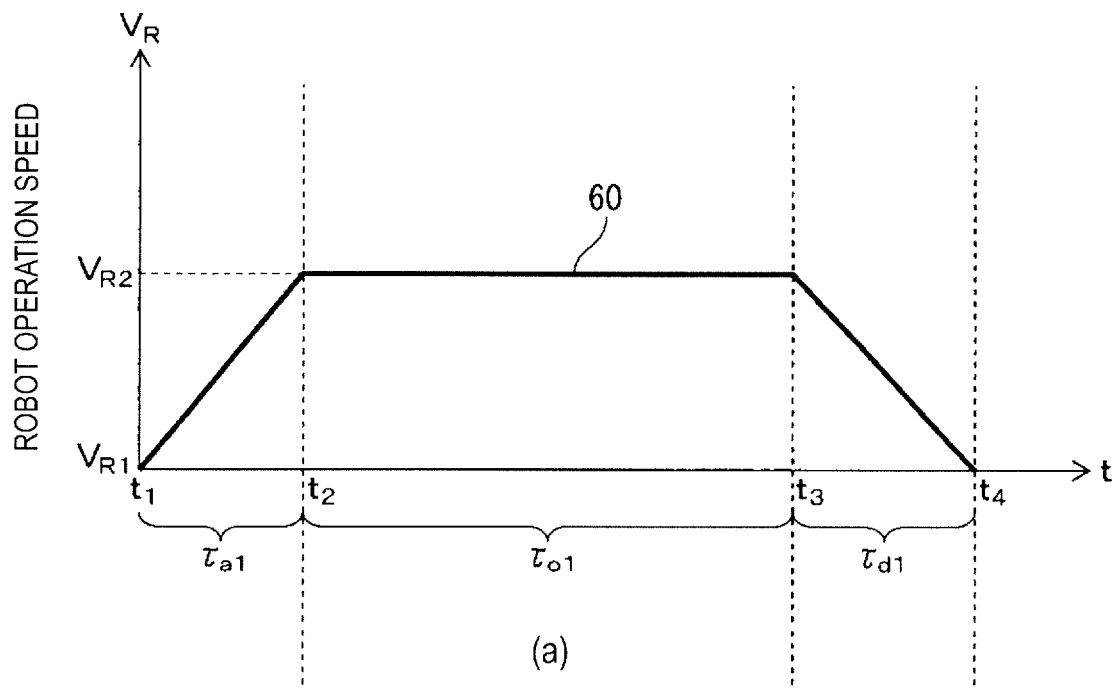
FIGS. 3A and 3B are graphs illustrating the relationship between operation speeds of a robot and a workpiece moving device and time.
Figure 3:
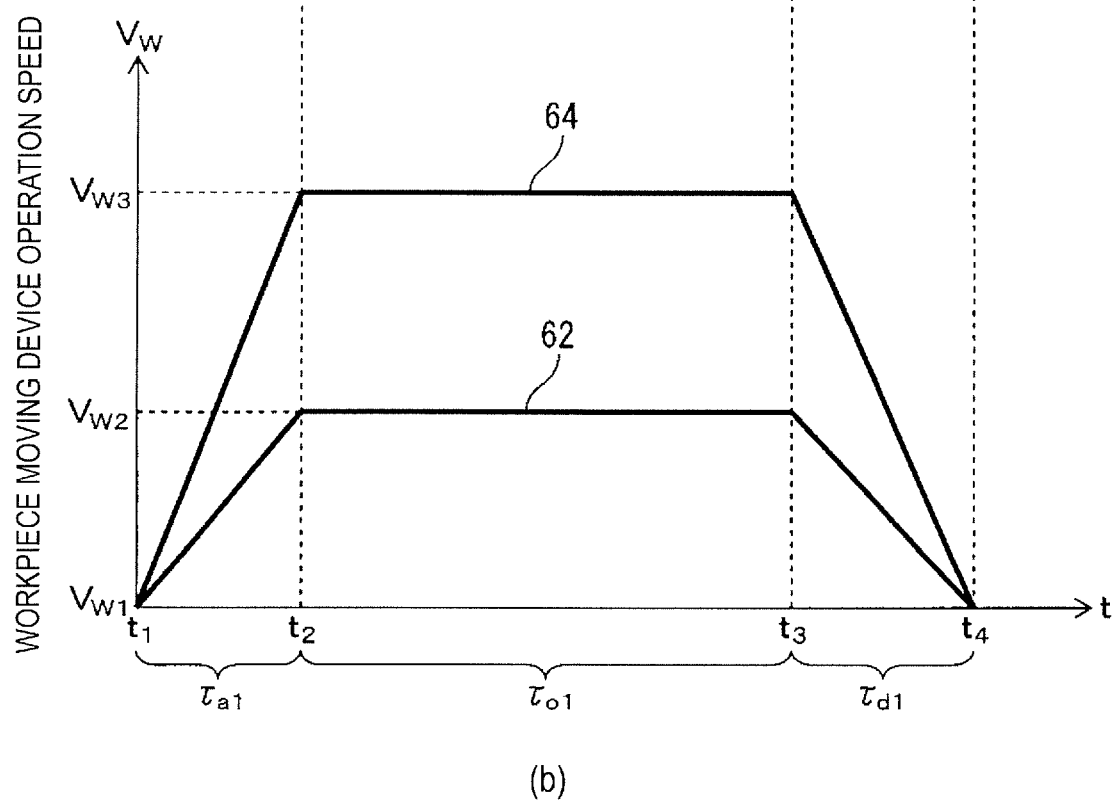

The graph shown in section (a) in FIG. 3 illustrates the relationship between an operation speed (more specifically, a speed at which the robot 12 moves the end effector 36) $V_R$ of the robot 12 and a time t during the workpiece processing operation. On the other hand, the graph shown in section (b) in FIG. 3 illustrates the relationship between an operation speed (more specifically, a speed at which the workpiece moving device 14 rotates the output flange 44) $V_W$ of the workpiece moving device 14 and the time t during the workpiece processing operation.

As illustrated by a characteristic 60 in section (a) in FIG. 3, when carrying out the workpiece processing operation, the robot controller 104 starts to operate the end effector 36 at a time point $t_1$ to start the work (i.e., arc welding) on the workpiece W.

Together with this operation, the robot controller 104 accelerates the robot 12 over a time period $\tau_{a1}$ from the time point $t_1$ to a time point $t_2$, so as to increase the operation speed $V_R$ of the robot 12 from a first speed $V_{R1}$ to a second speed $V_{R2}$.

The time period $\tau_{a1}$ is a time constant $\tau_{a1}$ for acceleration of the robot 12, wherein the time point $t_1$ corresponds to the commencement of the acceleration of the robot 12, while the time point $t_2$ corresponds to the termination of the acceleration of the robot 12. For example, the first speed $V_{R1}$ is zero. Then, the robot controller 104 operates the robot 12 at the constant operation speed $V_{R2}$ over a time period $\tau_{o1}$ from the time point $t_2$ to a time point $t_3$.

Then, the robot controller 104 decelerates the robot 12 over a time period $\tau_{d1}$ from the time point $t_3$ to a time point $t_4$, so as to decrease the operation speed $V_R$ from the second speed $V_{R2}$ to the first speed $V_{R1}$. The time period $\tau_{d1}$ is a time constant $\tau_{d1}$ for deceleration of the robot 12, wherein the time point $t_3$ corresponds to the commencement of the deceleration, while the time point $t_4$ corresponds to the termination of the deceleration.

The robot controller 104 stops the operation of the end effector 36 at the time point $t_4$ to end the work on the workpiece W. In synchronization with such an operation of the robot 12, the workpiece moving device controller 102 of the control device 100 operates the workpiece moving device 14.

Specifically, as illustrated by a characteristic 62 in section (b) in FIG. 3, the workpiece moving device controller 102 accelerates the workpiece moving device 14 over the time period $\tau_{a1}$ from the time point $t_1$ to the time point $t_2$, so as to increase an operation speed $V_W$ of the workpiece moving device 14 from a first speed $V_{W1}$ (e.g., $V_{W1}=0$) to a second speed $V_{W2}$.

The time period $\tau_{a1}$ is the time constant $\tau_{a1}$ for acceleration of the workpiece moving device 14, wherein the time point $t_1$ corresponds to the commencement of the acceleration of the workpiece moving device 14, while the time point $t_2$ corresponds to the termination of the acceleration of the workpiece moving device 14. Then, the control device 100 operates the workpiece moving device 14 at the constant operation speed $V_{W2}$ over the time period $\tau_{o1}$ from the time point $t_2$ to the time point $t_3$.

Then, the workpiece moving device controller 102 decelerates the workpiece moving device 14 over the time period $\tau_{d1}$ from the time point $t_3$ to the time point $t_4$, so as to decrease the operation speed $V_W$ from the second speed $V_{W2}$ to the first speed $V_{W1}$. The time period $\tau_{d1}$ is the time constant $\tau_{d1}$ for deceleration of the workpiece moving device 14, wherein the time point $t_3$ corresponds to the commencement of the deceleration of the workpiece moving device 14, while the time point $t_4$ corresponds to the termination of the deceleration of the workpiece moving device 14.

In this way, during the workpiece processing operation, the workpiece moving device controller 102 and the robot controller 104 accelerate and decelerate the workpiece moving device 14 and the robot 12, respectively, such that the timing of commencement $t_1$ and termination $t_2$ of the acceleration of the workpiece moving device 14 and the robot 12 are synchronized with each other, and the timing of commencement $t_3$ and termination $t_4$ of the deceleration of the workpiece moving device 14 and the robot 12 are synchronized with each other.

Thus, during the workpiece processing operation, the control device 100 carries out the work on the workpiece W by the end effector 36 while moving the end effector 36 relative to the workpiece W by the robot 12 in synchronization with moving the workpiece W by the workpiece moving device 14. By synchronizing the timing of commencement and termination of the acceleration and deceleration, it is possible to prevent irregularities in a trajectory of the work (i.e., a trajectory of arc welding) on the workpiece W.

After completing the workpiece processing operation (or before carrying out the workpiece processing operation), the control device 100 carries out an operation other than the workpiece processing operation (hereinafter, referred to as a "non-processing operation").

Figure 4:
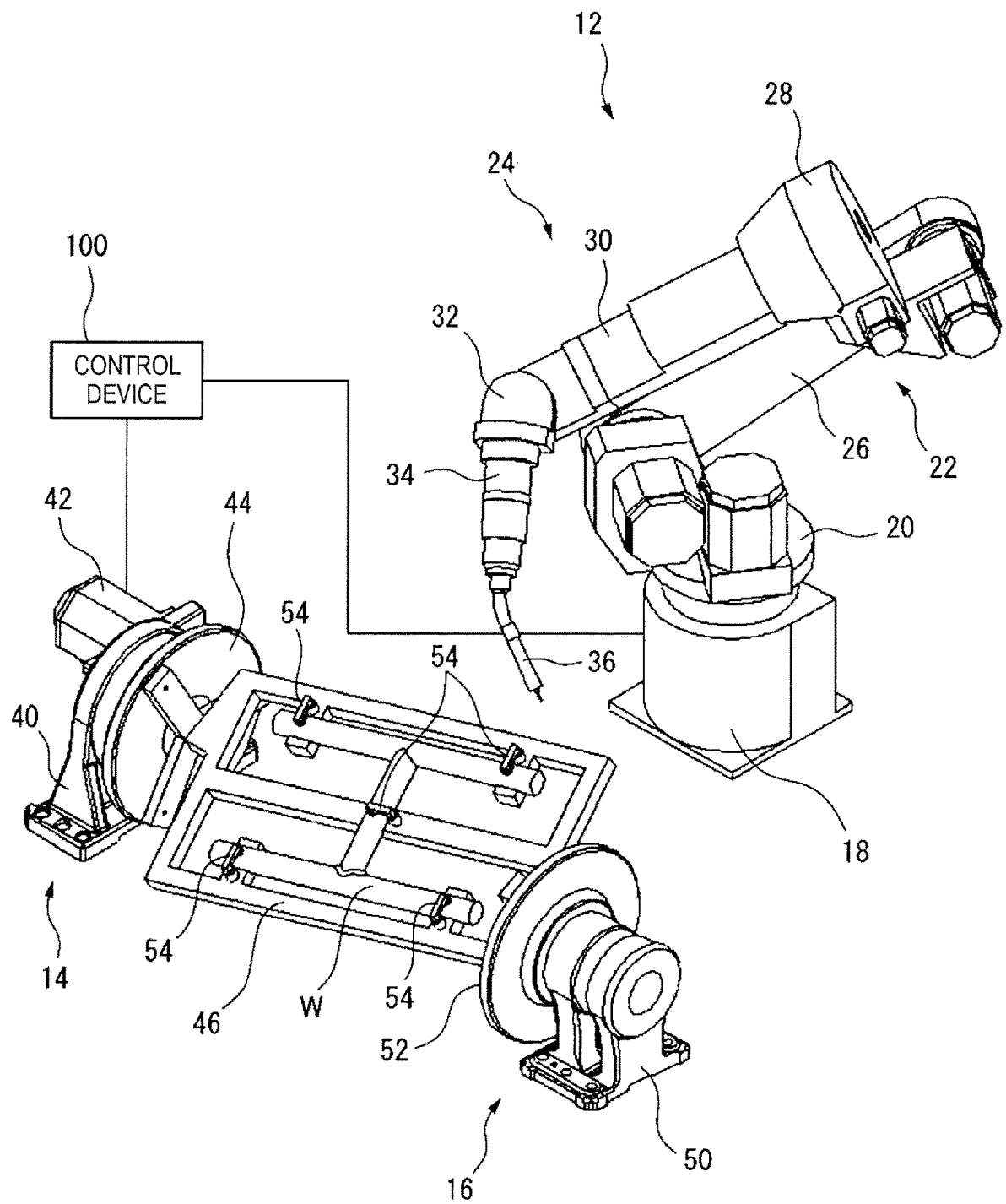
FIG. 4 is a view illustrating a state in which the system illustrated in FIG. 1 is performing a non-processing operation.

For example, as the non-processing operation, the control device 100 carries out a retracting operation and an approach operation. Specifically, the robot controller 104 operates the robot 12 in a state in which the end effector 36 is deactivated, so as to retract the end effector 36 from the workpiece W (retracting operation). As a result, the end effector 36 is retracted to a position separated from the workpiece W, as illustrated in FIG. 4.

Together with this operation, the workpiece moving device controller 102 operates the workpiece moving device 14 so as to rotate the output flange 44 by a predetermined angle, thereby moving the workpiece W to a desired position. Then, the robot controller 104 operates the robot 12 so as to move the end effector 36 to a waiting position for carrying out next workpiece processing operation (approach operation).

Note that, while carrying out the non-processing operation, the control device 100 may operates the robot 12 and the workpiece moving device 14 in cooperation with each other. Specifically, the control device 100 may retract the end effector 36 from the workpiece W by the robot 12 in synchronization with moving the workpiece W by the workpiece moving device 14.

In prior art, the time constant for acceleration or deceleration of the workpiece moving device 14 may be set to one value, and the time constant could not be set arbitrarily. In this case, the time constants $\tau_{a1}$ and $\tau_{d1}$ for acceleration and deceleration of the workpiece moving device 14 during the non-processing operation are set to a value $\tau_{SET}$, which is the same as that in the workpiece processing operation (i.e., $\tau_{a1} = \tau_{d1} = \tau_{SET}$).

A characteristic 64 in the graph in FIG. 3B illustrates an example of controlling the operation speed $V_W$ of the workpiece moving device 14 during the non-processing operation in the prior art. In this characteristic 64, the operation speed $V_W$ of the workpiece moving device 14 is increased from the first speed $V_{W1}$ to a third speed $V_{W3}$ ($>V_{W2}$) within the time constant $\tau_{a1}$ ($=\tau_{SET}$) from the time point $t_1$ to the time point $t_2$.

Then, the workpiece moving device 14 is operated at the constant speed $V_{W3}$ from the time point $t_2$ to the time point $t_3$. In this way, the workpiece moving device 14 is operated at a higher speed ($V_{W3} > V_{W2}$) than that in the workpiece processing operation.

Then, the operation speed $V_W$ is decreased from the third speed $V_{W3}$ to the first speed $V_{W1}$ within the time constant $\tau_{d1}$ ($=\tau_{SET}$) from the time point $t_3$ to the time point $t_4$. In the case of this characteristic 64, the absolute value of an acceleration "a" during acceleration and deceleration of the workpiece moving device 14 is larger than that in the characteristic 62.

In prior art, one time constant ($\tau_{SET}$) for the workpiece moving device 14 may be set to be minimum within an allowable range determined in the device's specification (e.g., the maximum load torque or allowable maximum inertia of the servomotor 48) of the workpiece moving device 14, in light of reduction of a cycle time.

When the workpiece moving device 14 is accelerated and decelerated in accordance with the characteristic 64 (i.e., the non-processing operation) by using such a minimum time constant ($\tau_{SET}$), the position displacement of the workpiece W placed on the jig 46 or an excessive load on the servomotor 48 may occur.

In order to avoid such a situation, the control device 100 according to this embodiment controls the workpiece moving device 14 such that the time constant for acceleration and deceleration of the workpiece moving device 14 during the non-processing operation is longer than the time constant ($\tau_{a1}$ and $\tau_{d1}$) for acceleration and deceleration of the workpiece moving device 14 during the workpiece processing operation.

Figure 5:
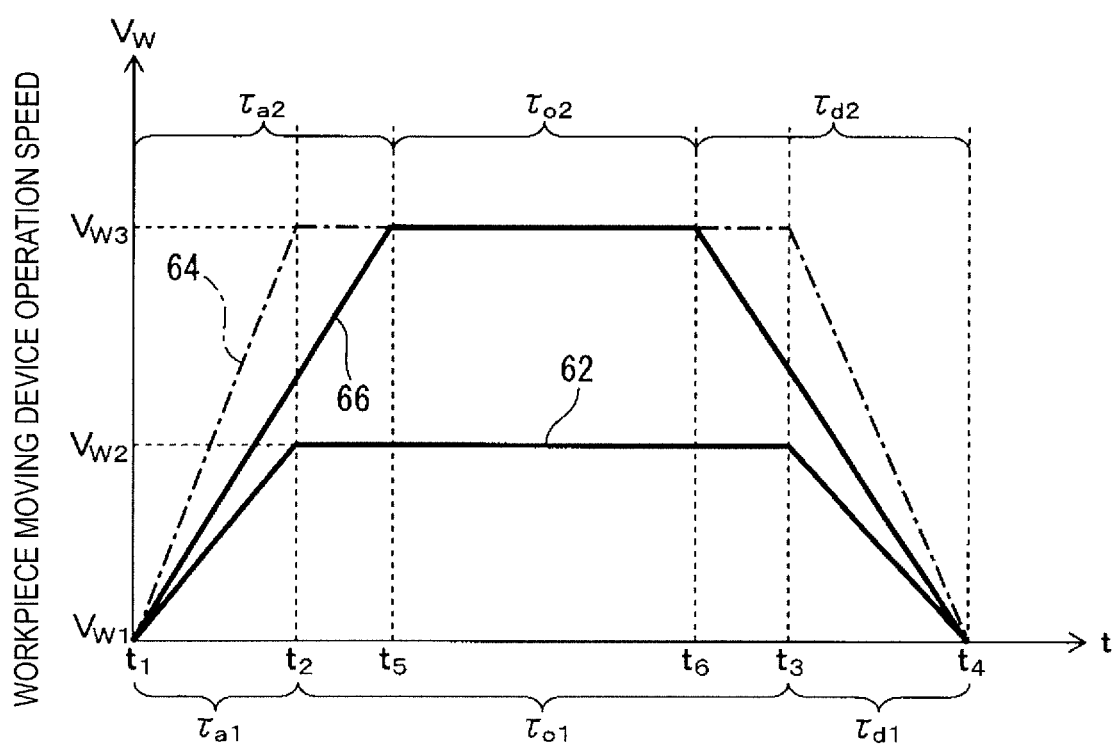
FIG. 5 is a graph illustrating the relationship between an operation speed of the workpiece moving device and time during the non-processing operation.

A characteristic 66 in FIG. 5 illustrates an example of controlling the operation speed $V_W$ of the workpiece moving device 14 during the non-processing operation, according to this embodiment. Note that, in FIG. 5, the characteristic 64 illustrated in FIG. 3 is represented as a chain line for comparison.

In the characteristic 66 according to this embodiment, the workpiece moving device controller 102 accelerates the workpiece moving device 14 from the time point $t_1$ (commencement of accelerate) to a time point $t_5$ (termination of acceleration) within a time constant $\tau_{a2}$ ($>\tau_{a1}$), so as to increase the operation speed $V_W$ of the workpiece moving device 14 from the first speed $V_{W1}$ to the third speed $V_{W3}$. Then, the control device 100 operates the workpiece moving device 14 at the constant operation speed $V_{W3}$ over a time period $\tau_{o2}$ ($<\tau_{o1}$ from the time point $t_5$ to a time point $t_6$.

Then, the workpiece moving device controller 102 decelerates the workpiece moving device 14 from the time point $t_6$ (commencement of deceleration) to the time point $t_4$ (termination of deceleration) within a time constant $\tau_{d2}$, so as to decrease the operation speed $V_W$ from the third speed $V_{W3}$ to the first speed $V_{W1}$. According to this characteristic 66, the absolute value of the acceleration "a" when the workpiece moving device 14 is accelerated and decelerated during the non-processing operation can be smaller than in the characteristic 64.

There are various methods of controlling the operation speed $V_W$ in accordance with the characteristic 66. As an example, the storage of the control device 100 pre-stores the time constants $\tau_{a1}$ and $\tau_{d1}$ for the workpiece processing operation, and the time constants $\tau_{a2}$ and $\tau_{d2}$ for the non-processing operation.

These time constants $\tau_{a1}$, $\tau_{d1}$, $\tau_{a2}$, and $\tau_{d2}$ are predetermined by a user in view of the specification of the jig 46 provided in the workpiece moving device 14 (e.g., clamping force of the jig for clamping the workpiece, or strength of the jig), the specification of the workpiece moving device 14 (e.g., the maximum load torque or allowable maximum inertia of the servomotor 48), work cycle time, etc.

During the workpiece processing operation, the workpiece moving device controller 102 generates a command for the servomotor 48 to operate the workpiece moving device 14 such that the time constants for the acceleration and deceleration of the workpiece moving device 14 are the time constants $\tau_{a1}$ and $\tau_{d1}$, respectively, as illustrated in the characteristic 62 in FIG. 5.

On the other hand, during the non-processing operation, the workpiece moving device controller 102 generates a command for the servomotor 48 to operate the workpiece moving device 14 such that the time constants for the acceleration and deceleration of the workpiece moving device 14 are the time constants $\tau_{a2}$ and $\tau_{d2}$, respectively, as illustrated in the characteristic 66 in FIG. 5.

In this way, the workpiece moving device controller 102 controls the operation of the workpiece moving device 14 in accordance with the predetermined time constants $\tau_{a1}$, $\tau_{d1}$, $\tau_{a2}$, and $\tau_{d2}$ (so-called, time constant control).

As another example, the workpiece moving device controller 102 generates a command (an acceleration command, a torque command, or a current command) for the servomotor 48 of the workpiece moving device 14 to control the workpiece moving device 14 such that the acceleration "a" of the workpiece moving device 14 does not exceed an allowable maximum value $a_{MAX}$ (so-called, acceleration control, torque control, or current control).

This allowable maximum value $a_{MAX}$ depends on the specification of the jig 46 (e.g., clamping force or strength) and the specification of the workpiece moving device 14 (e.g., the maximum load torque or allowable maximum inertia).

In this example, when accelerating the workpiece moving device 14 during the workpiece processing operation, the workpiece moving device controller 102 transmits a command $C_{a1}$ to the servomotor 48 so as to increase the operation speed $V_W$ of the workpiece moving device 14 from the first speed $V_{W1}$ to the second speed $V_{W2}$.

In addition, when decelerating the workpiece moving device 14 during the workpiece processing operation, the workpiece moving device controller 102 transmits a command $C_{d1}$ to the servomotor 48 so as to decrease the operation speed $V_W$ of the workpiece moving device 14 from the second speed $V_{W2}$ to the first speed $V_{W1}$.

On the other hand, when accelerating the workpiece moving device 14 during the non-processing operation, the workpiece moving device controller 102 transmits a command $C_{a2}$ to the servomotor 48 so as to increase the operation speed $V_W$ of the workpiece moving device 14 from the first speed $V_{W1}$ to the third speed $V_{W3}$.

In addition, when decelerating the workpiece moving device 14 during the non-processing operation, the workpiece moving device controller 102 transmits a command $C_{d2}$ to the servomotor 48 so as to decrease the operation speed $V_W$ of the workpiece moving device 14 from the third speed $V_{W3}$ to the first speed $V_{W1}$.

The above-mentioned commands $C_{a1}$, $C_{a2}$, $C_{d1}$, and $C_{d2}$ are predetermined by the user as values with which the acceleration "a" of the workpiece moving device 14 does not exceed the allowable maximum value $a_{MAX}$, and stored in the storage of the control device 100. For example, the commands $C_{a1}$, $C_{a2}$, $C_{d1}$, and $C_{d2}$ are set such that the acceleration "a" of the workpiece moving device 14 becomes as large as possible within a range not exceeding the allowable maximum value $a_{MAX}$.

Due to this, the workpiece moving device 14 is accelerated or decelerated such that the acceleration "a" thereof does not exceed the allowable maximum value $a_{MAX}$ during the non-processing operation. As a result, the time constants for the acceleration and deceleration of the workpiece moving device 14 become the time constants $\tau_{a2}$ ($>\tau_{a1}$) and $\tau_{d2}$ ($>\tau_{d1}$), as illustrated in the characteristic 66 in FIG. 5.

As described above, according to this embodiment, it is possible to prevent the acceleration "a" of the workpiece moving device 14 from being excessively large when the workpiece moving device 14 is accelerated or decelerated during the non-processing operation. Thereby, it is possible to prevent the position displacement of the workpiece W placed on the jig 46 or an excessive load on the servomotor 48 from occurring.

Note that, the time constant $\tau_{a1}$ for the acceleration during the workpiece processing operation may be set shorter than the time constant $\tau_{d1}$ for the deceleration. In addition, the time constant $\tau_{a2}$ for the acceleration during the non-processing operation may be set shorter than the time constant $\tau_{d2}$ for the deceleration.

By setting the time constants $\tau_{a1}$, $\tau_{d1}$, $\tau_{a2}$, $\tau_{d2}$ in this way, it is possible to advantageously decrease residual vibration of the output flange 44 (and the end effector 36) when the operation speed $V_W$ (and $V_R$) of the workpiece moving device 14 (and the robot 12) is decelerated from the second speed $V_{W2}$ (and $V_{R2}$) to the first speed $V_{W1}$ (and $V_{R1}$). However, the time constants may be set as $\tau_{a1}=\tau_{d1}$ or $\tau_{a2}=\tau_{d2}$.

Figure 6:
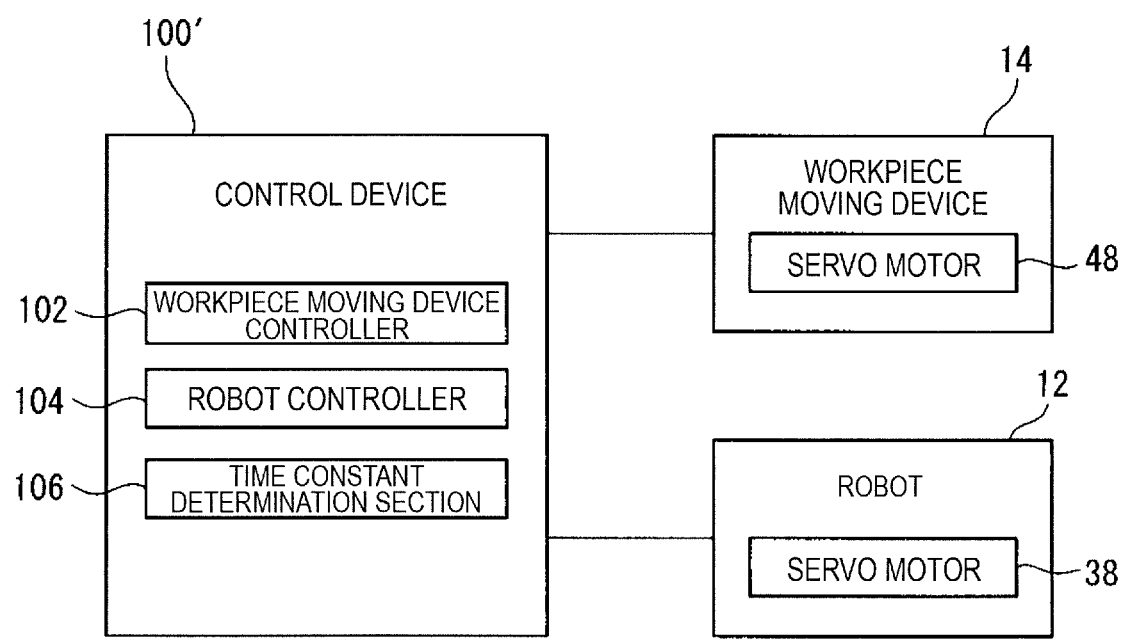
FIG. 6 is a block diagram of a system according to another embodiment.

Next, a control device 100' according to another embodiment will be described with reference to FIG. 6. The control device 100' can be applied to the system 10 instead of the above-described control device 100. The control device 100' is different from the above-described control device 100 in that the control device 100' further includes a time constant determination section 106.

A plurality of types of workpiece are processed in the system 10. The various workpieces to be processed can be classified into different types on the basis of the weight, shape, or dimension, etc. thereof (e.g., type A=workpiece weight: 10 kg, type B=workpiece weight: 15 kg, type C=workpiece weight: 30 kg, . . . ).

In this embodiment, the time constant determination section 106 automatically determines the above-described time constants $\tau_{a2}$ and $\tau_{d2}$ depending on the type of workpiece to be processed. As an example, the storage of the control device 100' stores a data table that indicates the relationship between the type of workpiece and the time constants $\tau_{a2}$ and $\tau_{d2}$.

The time constants $\tau_{a2}$ and $\tau_{d2}$ included in this data table for each type of workpiece are predetermined by the user on the basis of the information relating to the type of workpiece (e.g., a workpiece weight), the specification of the jig 46 (e.g., the clamping force, the strength), and the specification of the workpiece moving device 14 (e.g., the maximum load torque, allowable maximum inertia).

The control device 100' receives an input for identifying the type of workpiece from the user, host controller, or operation program. Upon reception of the input, the time constant determination section 106 identifies the type of workpiece, reads out from the data table the time constants $\tau_{a2}$ and $\tau_{d2}$ corresponding to the identified type, and determines the read-out time constants $\tau_{a1}$ and $\tau_{d2}$ as those to be used for acceleration and deceleration of the workpiece moving device 14 during the non-processing operation.

As another example, the control device 100' may temporarily operate the workpiece moving device 14 when a workpiece to be processed is set on the workpiece moving device 14, and determine the time constants $\tau_{a1}$ and $\tau_{d2}$ on the basis of a feedback value transmitted from the servomotor 48 at this time.

Specifically, an operator sets the workpiece on the jig 46. Then, the workpiece moving device controller 102 transmits a command to the servomotor 48 so as to temporarily operate the workpiece moving device 14 (i.e., rotate the output flange 44 by a predetermined angle).

At this time, the servomotor 48 transmits a feedback value (e.g., a load torque value or a feedback current value) to the control device 100. This feedback value depends on a load applied to the servomotor 48 (i.e., the weight of the workpiece set on the workpiece moving device 14). The time constant determination section 106 determines the time constants $\tau_{a2}$ and $\tau_{d2}$ on the basis of the feedback value received from the servomotor 48.

For example, the storage of the control device 100' stores a data table indicating the relationship between the feedback values from the servomotor 48 and the time constants $\tau_{a2}$ and $\tau_{d2}$. The time constants $\tau_{a2}$ and $\tau_{d2}$ included in this data table for each feedback value are predetermined by the user on the basis of e.g. the specification of the jig 46 and the specification of the workpiece moving device 14.

The time constant determination section 106 reads out from the data table the time constants $\tau_{a2}$ and $\tau_{d2}$ corresponding to the received feedback value, and determines the read-out time constants $\tau_{a2}$ and $\tau_{d2}$ as those to be used for acceleration and deceleration of the workpiece moving device 14 during the non-processing operation.

Alternatively, the time constant determination section 106 may determine the time constants $\tau_{a2}$ and $\tau_{d2}$ by calculation from the feedback value received from the servomotor 48.

By using the above-described methods, the time constant determination section 106 can determine the time constants $\tau_{a2}$ and $\tau_{d2}$ for acceleration and deceleration of the workpiece moving device 14 during the non-processing operation, in response to the type of workpiece to be processed.

Then, the workpiece moving device controller 102 performs the time constant control, acceleration control, torque control, or current control of the workpiece moving device 14 such that the workpiece moving device 14 is accelerated with the determined time constant $\tau_{a2}$, and decelerated with the determined time constant $\tau_{d2}$, as illustrated in the characteristic 66 in FIG. 5.

According to this embodiment, if a plurality of types of workpiece are to be processed, it is possible to automatically determine the time constants $\tau_{a2}$ and $\tau_{d2}$ for the non-processing operation, depending on the type of workpiece to be processed. Thereby, it is possible to optimize the time constants $\tau_{a2}$ and $\tau_{d2}$ in response to the type of workpiece, and therefore, the cycle time for work can be reduced while preventing the acceleration "a" of the workpiece moving device 14 from exceeding the allowable maximum value $a_{MAX}$.

In the above-described embodiment, the system 10 is for carrying out arc welding on the workpiece W. However, the system 10 may be a system for carrying out a work, such as laser machining or material spraying, on the workpiece W.

For example, if the system 10 is for laser machining, the end effector 36 is a laser emission nozzle. O the other hand, if the system 10 is for material spraying, the end effector 36 is a material spraying nozzle.

The workpiece moving device 14 is not limited to the one that rotates the circular output flange 44 about the axis O, but may be configured to move a rectangular output flange along a predetermined x-y plane (e.g., a horizontal plane), for example.

In the embodiment illustrated in FIG. 2, the control device 100 includes the workpiece moving device controller 102 and the robot controller 104. However, the robot controller 104 may be provided as a separate element from the control device 100.

Figure 7:
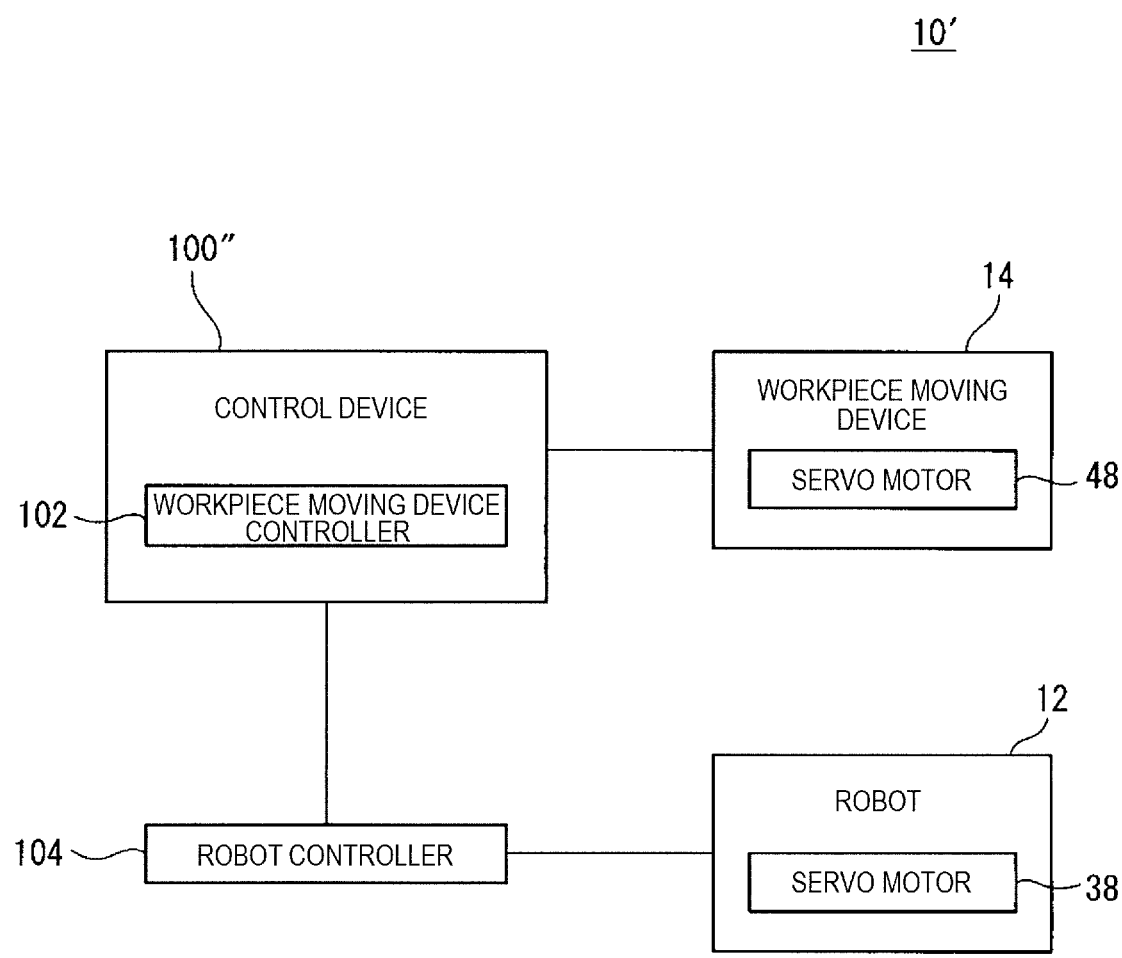
FIG. 7 is a block diagram of a system according to yet another embodiment.

Such an embodiment is illustrated in FIG. 7. In a system 10' illustrated in FIG. 7, a control device 100" includes the workpiece moving device controller 102, whereas the robot controller 104 is provided as a separate element from the control device 100" and communicably connected to the control device 100". For example, the robot controller 104 is comprised of a computer including at least one processor and storage, and controls the robot 12 as described above.

While the present disclosure has been described through the embodiments, the above-described embodiments do not limit the invention as defined by the appended claims.

The invention claimed is:

1. A control device configured to control a workpiece moving device moving a workpiece and a robot carrying out a work on the workpiece such that the workpiece moving device and the robot cooperate with each other,
   the control device comprising a workpiece moving device controller configured to control the workpiece moving device such that a time constant for when the robot and the workpiece moving device perform an operation other than a workpiece processing operation, in which the robot and the workpiece moving device carries out a work on the workpiece in cooperation with each other, is longer than that for when the robot and the workpiece moving device performs the workpiece processing operation, the time constant corresponding to a time period from commencement to termination of acceleration or deceleration of the workpiece moving device.

2. The control device of claim 1, further comprising a robot controller configured to accelerate or decelerate the robot in synchronization with the commencement and the termination of acceleration or deceleration of the workpiece moving device when performing the workpiece processing operation.

3. The control device of claim 1, wherein, when performing the operation other than the workpiece processing operation, the workpiece moving device controller operates the workpiece moving device at a speed higher than that in the workpiece processing operation.

4. The control device of claim 1, wherein the workpiece moving device controller controls the workpiece moving device such that the time constant for the acceleration of the workpiece moving device is shorter than that for the deceleration of the workpiece moving device, when performing the workpiece processing operation or the operation other than the workpiece processing operation.

5. The control device of claim 1, further comprising a time constant determination section configured to determine the time constant depending on a type of workpiece.

6. A method of controlling a workpiece moving device moving a workpiece and a robot carrying out a work on the workpiece such that the workpiece moving device and the robot cooperate with each other,
   the method comprising controlling the workpiece moving device such that a time constant for when the robot and the workpiece moving device perform an operation other than a workpiece processing operation, in which the robot and the workpiece moving device carries out a work on the workpiece in cooperation with each other, is longer than that for when the robot and the workpiece moving device performs the workpiece processing operation, the time constant corresponding to a time period from commencement to termination of acceleration or deceleration of the workpiece moving device.

\* \* \* \* \*